US007835630B2

(12) United States Patent
Kazanzides et al.

(10) Patent No.: US 7,835,630 B2
(45) Date of Patent: Nov. 16, 2010

(54) ADAPTIVE AND RECONFIGURABLE SYSTEM FOR DC MOTOR CONTROL (75) Inventors: Peter Kazanzides, Baltimore, MD (US); Ndubuisi John Ekekwe, Baltimore, MD (US); Ralph Etienne-Cummings, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 384 days.

(21) Appl. No.: 12/061,896

(22) Filed: Apr. 3, 2008

(65) Prior Publication Data
US 2008/0247735 A1 Oct. 9, 2008

Related U.S. Application Data (60) Provisional application No. 60/922,260, filed on Apr. 6, 2007.

(51) Int. Cl.
G05F 1/10 (2006.01)
(52) U.S. Cl. .................. 388/815; 318/800; 318/805; 318/803; 318/811; 318/808; 318/809; 318/810; 318/807; 702/127; 702/108; 702/85; 73/514.26; 324/415; 324/160; 324/163; 324/165; 324/76.47; 324/76.55; 324/76.79
(58) Field of Classification Search ................ 318/800, 318/805, 803, 807–811, 34; 702/127, 108, 702/85; 73/514.26; 324/415, 160, 163, 165, 324/76.47, 76.55, 76.79, 514.16
See application file for complete search history.

(56) References Cited

U.S. PATENT DOCUMENTS 4,099,111 A 7/1978 Inaba et al.

(Continued)

FOREIGN PATENT DOCUMENTS

| EP | 0066159 | 9/1986 |
|---|---|---|
| EP | 0850508 | 6/1997 |
| JP | 57208886 | 12/1982 |
| JP | 57208887 | 12/1982 |
| JP | 04098506 | 3/1992 |
| WO | 2002054574 | 7/2002 |

OTHER PUBLICATIONS

Ekekwe et al., "A Configurable VLSI Chip for DC Motor Control for Compact, Low-Current Robotic Systems", 2006, IEEE.

(Continued)

Primary Examiner—Rita Leykin
(74) Attorney, Agent, or Firm—The Johns Hopkins University; Jeffrey W. Childers (57) ABSTRACT An integrated circuit for controlling a DC motor is disclosed. The integrated circuit includes at least one digital position and speed circuit (DPS) for providing measurements of speed, position, and direction of the motor, the DPS being in signal communication with the motor for receiving a pair of signals having a quadrature relationship; and at least one programmable gain amplifier (PGA) electrically coupled to the motor, the PGA being configured to receive a feedback signal indicative of current flowing through the motor and to apply a second signal to the motor for adjusting the speed of the motor; and at least two analog-to-digital converters (A/D), one A/D being used to quantize the output of the PGA for an off-chip processor; and another A/D to provide motor reference position from an analog sensor, such as a potentiometer; and at least two digital-to-analog converters (D/A), one D/A used to set the motor voltage; and another D/A used to set the motor current limit. The integrated circuit can be incorporated into a larger motor control loop which further includes a summing amplifier for providing the feedback signal to the motor that is indicative of current flowing through the motor; a buffer amplifier electrically for sensing the output current of the motor, and a processor for providing control signals to the system monolithic module and for receiving the measurements of speed, position, and direction of the motor.

28 Claims, 5 Drawing Sheets

U.S. PATENT DOCUMENTS

| | | | | |
|---|---|---|---|---|
| 4,429,267 | A | * | 1/1984 | Veale ........................ 318/594 |
| 4,494,051 | A | | 1/1985 | Bailey |
| 4,713,590 | A | | 12/1987 | Ohno |
| 5,051,670 | A | | 9/1991 | De Piola |
| 5,811,946 | A | * | 9/1998 | Mullin et al. ............... 388/811 |
| 6,002,234 | A | * | 12/1999 | Ohm et al. ................. 318/729 |
| 6,891,346 | B2 | | 5/2005 | Simmons et al. |
| 2008/0084171 | A1 | * | 4/2008 | Leehey et al. ................. 318/34 |

OTHER PUBLICATIONS

Ekekwe at al., "Modeling and Simulation of a VLSI for Adaptive Speed Control of Brushed DC Motors", 2006, Proc. Intl. Conf. on Control and Applications.

Ekekwe et al., "A wide speed range and high precision position and velocity measurements chip with serial peripheral interface", Feb. 2008, Integration, the VLSI Journal, vol. 41, Issue 2, pp. 297-305.

Ekekwe et al., "Incremental Encoder Based Position and Velocity Measurements VLSI Chip with Serial Peripheral Interface", May 2007, IEEE Proceedings of the International Symposium on Circuits and Systems (ISCAS), New Orleans.

Trump, Bruce, "DC Motor Speed Controller: Control a DC Motor without Tachometer Feedback", 1999, Burr-Brown Corporation.

Kapoor et al., "A System for Speed and Torque Control of DC Motor with Application to Small Snake Robots", Sep. 13, 2004, IEEE Mechatronics & Robotics, Aachen, Germany.

Taylor et al., "A Dexterous System for Laryngeal Surgery", 2004, IEEE Proceedings of the International Conference on Robotics and Automation, New Orleans.

Abo et al, "A 1.5-V, 10-bit, 14.3-MS/s CMOS Pipeline Analog-to-Digital Converter", 1999, IEEE.

Johns, D.A. and Martins, Ken, "Analog Integrated Circuit Design, Toronto, Canada," John Wiley, 1997, pp. 463-484.

Guzman-Serrano, E., et al., "Slot-by-Slot Brushless DC Motor Commutation Technique," 2004, vol. 2, pp. 513-516.

Yong-Ho, Yoon, et al., "PLL Control Algorithm for Precise Speed Control of the Slotless PM Brushless DC Using 2Hall-ICs," 2004 IEEE 35th Annual Power Electronics Specialists Conference, Jun. 20-25, 2004, pp. 1314-1321 vol. 2.

Choe, You Young, "Speed Control System of Slotless PM Brushless DC Motor Using 2Hall-ICs", 30th Annual Conference of IEEE Industrial Electronics Society, Nov. 02-06, 2004, pp. 1374-1379.

Squires, D., et al., "A Dedicated IC for DC Closed Loop Position Control," 1986, IEEE, Official Proceedings of the Ninth International Motor-Con '86 Conference.

Qu, L. et al. "A Microprocessor-Based Speed/Position Controller for Brushless DC Motor," 1986, IEEE, Conference Record of 1986 IEEE Industry Applications Society Annual Meeting.

Tomasek, Jaroslav, "Integrated Resolver-Based Position and Velocity Feedback Modules," Jun. 28, 1985, Elsevier, Fourteenth Annual Symposium, Incremental Motion Control Systems and Devices.

Durusu, Nezih, "Brushless DC Motors, Velocity and Position Control of the Brushless DC Motor," Jun. 1986, Thesis Naval Postgraduate School, Monterey, CA.

Mota, Philippe, et al., "Digital Position Servo System—A State Variable Feedback System," Nov. 1984, IEEE, IEEE Transactions on Industry Applications.

Bucella, T., et al., "Single-chip DSP controller IC Provides High-performance Brushless DC Servo," Mar. 1992, Powerconversion & Intellectual Motion.

* cited by examiner

ADAPTIVE AND RECONFIGURABLE SYSTEM FOR DC MOTOR CONTROL

CROSS-REFERENCE TO RELATED APPLICATIONS

This application claims the benefit of U.S. provisional patent application No. 60/922,260 filed Apr. 6, 2007, the disclosure of which is incorporated herein by reference in its entirety.

FIELD OF THE INVENTION

The present invention relates generally to DC motor control, and more particularly to a reconfigurable and adaptive mixed analog/digital integrated circuit for controlling and measuring the speed, position, and torque of DC motors.

BACKGROUND OF THE INVENTION

Robots are becoming prevalent in 21st century industrial and post-industrial societies. Robots find uses in industrial assembly, the military, toys, and in medicine. In the case of medicine, there are many applications that employ a robot comprising multiple, relatively low speed DC motors for control of surgical instruments. One such surgical application is for throat surgery. Minimally invasive surgery (MIS) of the throat is characterized by insertion of endoscopes and multiple long tools through a narrow tube (the laryngoscope) inserted into the patient's mouth. Current manual instrumentation is awkward, hard to manipulate precisely, and lacks sufficient dexterity to permit common surgical subtasks such as suturing vocal fold tissue.

This clinical problem motivated the development of a system for MIS of the upper airway including the throat and larynx, which is described in N. Simaan, R. Taylor, P. Flint, "A dexterous system for laryngeal surgery—multi-backbone bending snake-like slaves for teleoperated dexterous surgical tool manipulation," *Proc. IEEE Intl. Conf. on Robotics and Auto*, New Orleans, La., May 2004. The system included Distal Dexterity Units (DDU) for tool/tissue manipulation, and another DDU for suction. A DDU is a 7-axis robot, which is manipulated by a 4 axis Tool Manipulation Unit (TMU). The total robot system comprised three DDU/TMU arms (each with 11 axes) and a rotating base unit (RBU) for a total of 34 axes, and hence, 34 motors were needed. Because the surgical robot was a small-scale design and does not require high joint speeds, it was possible to use small, low-power motors with high gear reductions.

Several commercially available motion controllers and amplifiers were evaluated, but none of them satisfied all of the system requirements. One major difficulty was that even the small (low power) amplifiers were rated at several Amps and would therefore provide motor current feedback signals that were scaled to this range. This would not provide sufficient resolution. Therefore, a custom Low Power Motor Controller (LoPoMoCo) board was designed, as described in A. Kapoor, N. Simaan, P. Kazanzides, "A System for Speed and Torque Control of DC Motors with Application to Small Snake Robots", *Proc. IEEE/APS Conf on Mechatronics & Robotics*, Aachen, Germany, September 2004. This board is a half-length ISA card that can drive 4 robot axes.

Although the LoPoMoCo board satisfied system requirements, it was relatively large in size and therefore could not be physically located near an MIS robot because it would obstruct the surgeon's view. Further, 9 LoPoMoCo boards, installed in multiple PCs, were required to control the 34 axis robot. These boards were connected to the robot system via a large bundle of cables—each LoPoMoCo contained a 68-conductor signal cable and a 9-conductor motor power cable. Dragging 9 sets of cables could affect robot accuracy. In addition, the LoPoMoCo boards originally developed for the snake robot were found to be useful for other robot systems. Configuration of the boards was difficult, however, because the low-level speed control requires several resistor values to be set based on the motor parameters (in particular, the winding resistance). This led to an additional requirement that a robot motor control design be software-reconfigurable so that it can easily be used for a wide variety of brushed DC motors.

Accordingly, what would be desirable, but has not yet been provided, is a reduced-size, highly integrated, motor control circuit which can both control and measure the position, velocity, and torque of DC motors.

SUMMARY OF THE INVENTION

The above-described problems are addressed and a technical solution achieved in the art by providing an integrated circuit for controlling a DC motor, which is hereby disclosed. The integrated circuit includes at least one digital position and speed circuit (DPS) for providing measurements of speed, position, and direction of the motor, the DPS being in signal communication with the motor for receiving a pair of signals having a quadrature relationship; and at least one programmable gain amplifier (PGA) electrically coupled to the motor, the PGA being configured to receive a feedback signal indicative of the current flowing through the motor and to apply a second signal to regulate the speed of the motor. The integrated circuit can be incorporated into a larger motor control loop which further includes one or more power amplifiers that sum the desired motor speed with the feedback signal from the PGA; a resistor and buffer amplifier for sensing the output current of the motor; and a processor or other digital logic for providing system control signals and for receiving the measurements of speed, position, and direction of the motor. The power amplifier may also contain an input signal that specifies the maximum motor current. The integrated circuit is configured to control the speed, the torque, or the position of the motor.

The DPS includes the circuitry for measuring the position of the motor and the speed of the motor based on either frequency counting or period counting. The circuitry for measuring position of the motor includes a QDECODER circuit block for decoding the pair of signals having a quadrature relationship to an UP or DOWN signal for providing an indication of the direction of rotation of the motor and for providing a count signal indicative of a quadrature pulse count; an UP/DOWN synchronous counter electrically coupled to the QDECODER circuit block for counting the quadrature pulse count; and a parallel in-serial out register (PISO) electrically coupled to the UP/DOWN synchronous counter for serializing the quadrature pulse count so as to provide an indication of motor position. The circuitry for measuring the speed of the motor based on frequency counting includes a toggle flip flop for receiving a fixed time pulse; a counter electrically coupled to the toggle flip flop, the toggle flip flop enabling the counter for a fixed period of time, the counter receiving one of the pair of signals, the counter being configured to count a number of pulses from the one of the pair of signals for the time the counter is enabled so as to provide an indication of the frequency of the motor; and a latch and PISO electrically coupled to the counter for storing and serializing the indication of the frequency of the motor.

The circuitry for measuring the speed of the motor based on period counting includes a toggle flip flop for receiving one of the pair of signals; a counter electrically coupled to the toggle flip flop, the counter receiving an external clock, the counter being configured to count the number of pulses from the external clock that occur between successive pulses of one of the pair of signals so as to provide an indication of the time period of the motor; and a latch and PISO electrically coupled to the counter for storing and serializing the indication of the time period of the motor. Frequency counting is used for medium and high motor speeds and period counting is used for low motor speeds. The system employs a mixed on-chip (i.e. monolithic integrated)/off-chip architecture.

The on-chip module includes the DPS, a digital-to-analog converter (D/A) configured to set the motor voltage and a second digital-to-analog converter (D/A) configured to set a maximum limit on current that is input to the motor. The on-chip module further comprises an analog-to-digital converter (A/D) electrically coupled to the PGA for receiving a measurement of the feedback signal of the PGA and a second A/D for measuring the absolute position of the motor. Serial-in-parallel out registers (SIPO) are used to electrically couple data from the processor to the two digital-to-analog converters (D/A), and PGA via latches. Along with PISO and SIPO, a serial peripheral interface (SPI) circuit is implemented between the monolithic circuit and the processor. The processor provides the clock and control signals to the monolithic circuit (on-chip module) for synchronizing all the system signals.

The larger motor control loop can further include an incremental encoder optically coupled to the motor for providing the pair of signals having a quadrature relationship. An absolute analog sensor, such as a potentiometer, can be coupled to the motor for setting the initial position of the motor, the analog sensor also being coupled to the on-chip module.

BRIEF DESCRIPTION OF THE DRAWINGS

The present invention will be more readily understood from the detailed description of an exemplary embodiment presented below considered in conjunction with the attached drawings, of which.

It is to be understood that the attached drawings are for purposes of illustrating the concepts of the invention and may not be to scale.

DETAILED DESCRIPTION OF THE INVENTION

Figure 1:
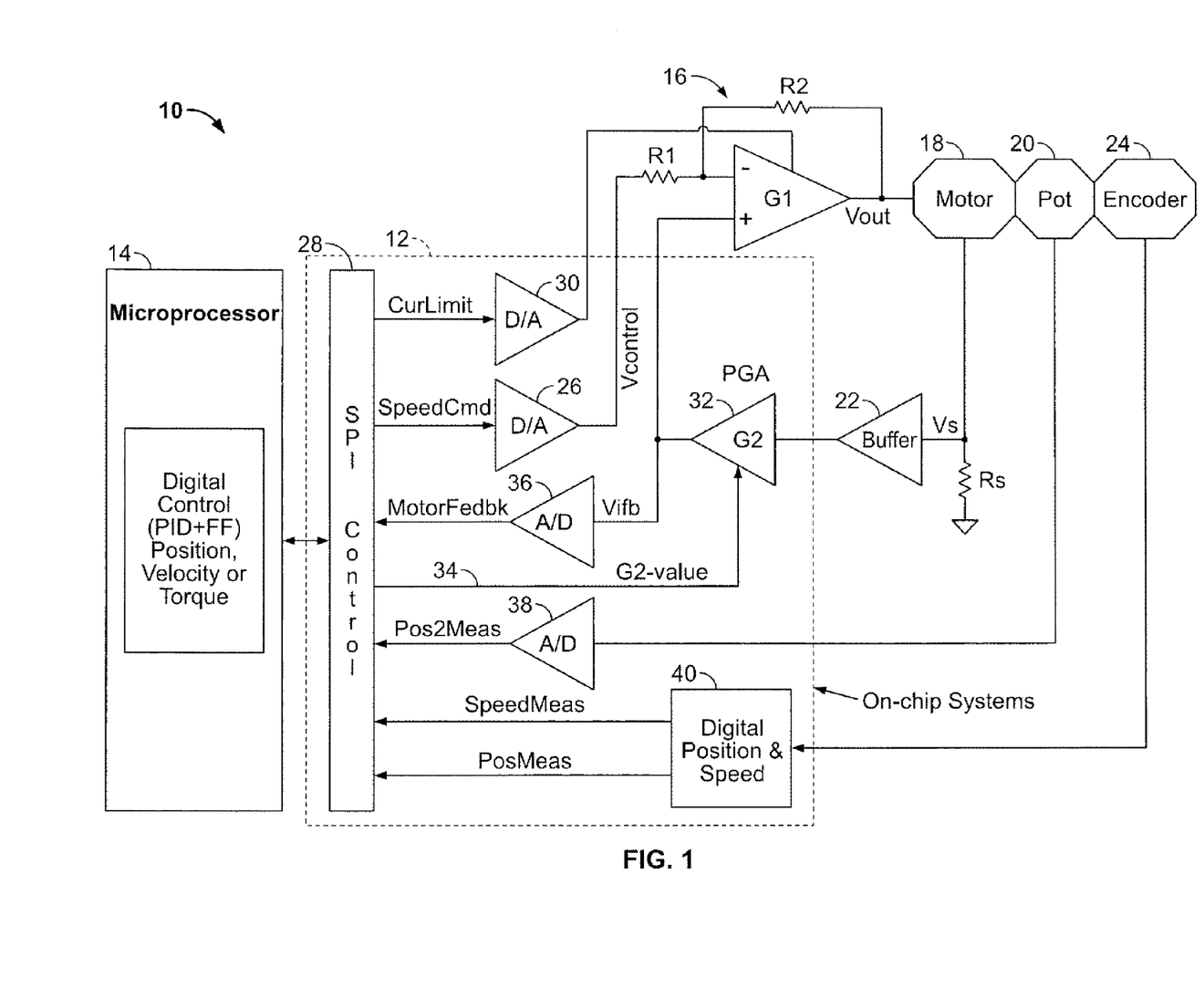
FIG. 1 is an electrical schematic diagram of a motor control circuit, constructed in accordance with an embodiment of the present invention. This circuit depicts a bipolar amplifier design (i.e., with both positive and negative power supplies). The invention also applies, with minor modifications, to other amplifier designs, such as a bridge amplifier which requires just a single (unipolar) supply voltage.

FIG. 1 is an electrical schematic diagram of a motor control circuit 10, constructed in accordance with an embodiment of the present invention. The motor control circuit 10 includes a mixed analog/digital control/measurement circuit block 12, implemented as a VLSI integrated circuit chip, a supervisory microprocessor 14 digitally coupled to the control/measurement circuit block 12, an external amplifier 16 whose inverting input $V_{control}$ is controlled by an analog voltage supplied by the control/measurement circuit block 12, a DC motor 18 whose initial position is set by an absolute analog sensor, such as a potentiometer, 20 and whose armature current is sensed by a buffer/sensor 22, the buffer/sensor 22 providing a feedback signal to the control/measurement circuit block 12, and an incremental encoder 24 that is optically coupled to the motor 18 and provides one of a pair of digital quadrature signals to the control/measurement circuit block 12. The control/measurement circuit block 12 includes a digital-to-analog converter (D/A) 26 which is configured to set the DC motor voltage ($V_{control}$) under the control of the supervisory microprocessor 14 (SpeedCmd) via a serial peripheral interface (SPI) circuit 28. The control/measurement circuit block 12 further includes a second digital-to-analog converter (D/A) 30 which is configured to set a maximum limit on current output for the external amplifier 16 for protection of the DC motor 18 via the supervisory microprocessor 14 (CurLimit). The control/measurement block 12 further includes a programmable gain amplifier (PGA) 32 for providing current feedback control to the non-inverting input of the external amplifier 16. The supervisory microprocessor 14 provides a signal line 34 (G2-value) via the serial peripheral interface (SPI) circuit 28 to set the gain of the PGA 32, and further receives a measurement of the feedback signal (Vifb) of the PGA 32 via an analog-to-digital converter (A/D) 36 (MotorFedbk). A second A/D 38 is used to measure the value of the voltage across the absolute analog sensor 20 (Pos2Meas) as an indication to the supervisory microprocessor 14 of the initial position of the DC motor 18. The control/measurement circuit block 12 also includes a digital position and speed module (DPS) 40 which receives quadrature signals from an incremental encoder 24 and converts these signal to measurements of speed, position, and direction of rotation of the DC motor 18, the measurement signals (SpeedMeas, PosMeas) being serialized and synchronized by the SPI circuit 28 and fed to the supervisory microprocessor 12.

The design depicted in FIG. I employs a mixed on-chip/off-chip architecture. In FIG. 1, the A/Ds 36, 38, the D/As 26, 30, the PGA 32, and the DPS module 40 are shown to be incorporated into a monolithic VLSI integrated circuit 12, with the amplifier 16, absolute analog sensor (potentiometer) 20, and the buffer/sensor 22 being external to the integrated circuit 12. In other embodiments, the functionality of the amplifier 16, analog sensor (potentiometer) 20, and the buffer/sensor 22 can be incorporated onto the same VLSI integrated circuit as the A/Ds 36, 38, D/As 26, 30, programmable gain amplifier 32, and the DPS module 40. In still other embodiments, arrays of A/Ds, D/As, programmable gain amplifiers, digital position and speed circuits, and optional summing amplifiers and sensor/buffers can be incorporated onto a single monolithic integrated VLSI circuit in order to control several motors at once. In still other embodiments, the DPS module 40 can be incorporated alone as a monolithic VLSI integrated circuit for providing a means to measure speed and position of motors using incremental encoders. In yet other embodiments, the amplifier 16 and the buffer 22 can be replaced by two amplifiers and a differential buffer to achieve a bridge amplifier design.

Figure 2:
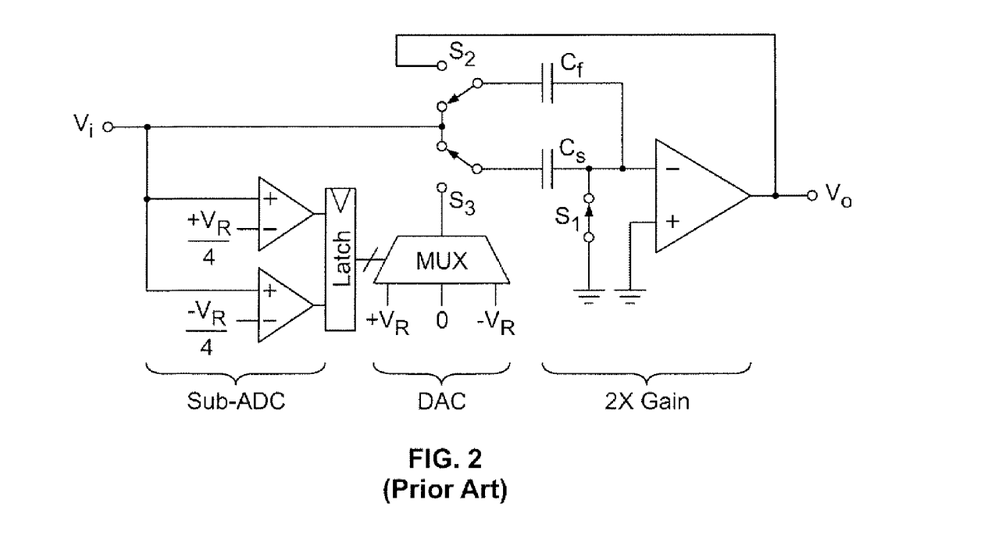
FIG. 2 shows an electrical schematic diagram of a single stage of a pipeline leading into the input of one of the analog-to-digital converters of FIG. 1 with major sub-modules of sub-ADC, sub-DAC and gain.

Because the VLSI chip 12 is generally limited to low operating voltages, typically 5V signals, $G_1$, the gain of the external amplifier 16 is selected to scale the VLSI chip 12 output to a maximum motor voltage. For example, by setting $G_1=10$, the VLSI chip 12 can be used to drive motors rated at 48V. $V_{control}$ is the motor speed control voltage which is connected to the inverting input of the power op amp with gain, $G_1=-R_2/R_1$. The analog-to-digital converters (A/D) 36, 38, have been designed using the 1.5-bit/stage pipelined architecture as described in Abo, Andrew M. and Paul R. Gray, "A 1.5-V, 10-bit, 14.3-MS/s CMOS pipeline analog-to-digital converter," IEEE J. Solid-State Circuits, vol. 34, no. 5, pp. 599-606, May 1999, but modified (at $V_{dd}$ of 5V) to enhance speed and accuracy. A telescopic transconductance amplifier (OTA) with gain boosting, wide swing cascade bias and common mode feedback modules were used over a normal class-A OTA. A digital error correction module was also added to the outputs. FIG. 2 shows a single stage of the pipeline leading into the input of the ADC (i.e., the A/D) with major sub-modules of sub-ADC, sub-DAC and gain. The choice of a pipelined architecture is due to its speed compared with other ADCs. However, the present invention is not limited to a pipelined architecture. The digital-to-analog converters (D/A) 26, 30, have been designed based on switched capacitor with thermometer codes for better matching of the capacitors as described in D. A. Johns and Ken Martins, "Analog Integrated Circuit Design." Toronto, Canada: John Wiley, 1997, pp. 463-484. The DPS module 40 is described in detail herein below in connection with FIG. 6. The DPS module 40 is primarily comprised of counters which are used to measure the time between transitions of the pulses (periodic counting) or to measure the number of encoder pulses in a given time interval (frequency counting). Either of the two results would be available to the supervisory microprocessor 12 and the better result would be chosen for the control. When the motor speed is very low, periodic counting is preferred while when the speed is high, the microprocessor 12 chooses frequency counting. The design is based on the FPGA implementation described in A. Kapoor, N. Simaan, P. Kazanzides, "A System for Speed and Torque Control of DC Motors with Application to Small Snake Robots", Proc. *IEEE/APS Conf. on Mechatronics & Robotics*, Aachen, Germany, September 2004. The design of the PGA 32 is based on switched resistors that are switched by the supervisory microprocessor 12 via the SPI 28 based on the required gain, $G_2$, in the system. The required gain is based on several factors to be described hereinafter. The design of the system 10 and the VLSI chip 12 are flexible enough to allow for most commercially available microprocessors/microcontrollers to be chosen as the supervisory microprocessor 14.

The circuit 10 of FIG. 1 can be used to control the speed, the torque, or the position of the DC motor 18. When the current limit ($I_{curLimit}$) signal is varied (keeping $V_{out}$ constant), torque can be controlled. To control position of the DC motor 18, the initial Pos2meas output of the A/D 38 is used as a reference while a control algorithm in the supervisory processor 14 monitors the position result (PosMeas) from the DPS module 40. In such circumstances, the current input to the DC motor 18 is held constant, but $V_{control}$ is varied. When $I_{curLimit}$ is held constant while $V_{control}$ is varied (in conjunction with the SpeedMeas output of the DPS module 40 provided to the supervisory microprocessor 14), then the speed of the DC motor 18 can be controlled.

The following discussion illustrates the operation of the system 10 in general and the VLSI chip 12 in particular by focusing on a method for controlling and maintaining the speed of the DC motor 18.

Under steady state conditions, the speed of a DC motor assuming a separately excited motor is given by $$\omega = \frac{V_{out} - I_m R_m}{K\phi} \quad (1)$$

where $\omega$ is the motor speed, $\phi$ is the flux, $V_{out}$ is the armature voltage, $I_m$ and $R_m$ are armature current and resistance respectively, and K is a constant that depends on design parameters such as number of conductors, number of poles, and number of parallel paths. From equation (1), motor speed can be varied by the control of the armature applied voltage, armature resistance and field flux. For armature resistance control, resistance is inserted to control the motor speed. The major drawback of this technique is increased power loss after a long period of operation. This limits its usage in lower power systems. In the case of field flux (or field voltage) control, instability from motor sensitivity to field voltage variations limits its applications in critical systems like medical robots. The variation of armature voltage is the most versatile, simple and most efficient method of motor speed control especially for low power systems. The only controlled variable is the armature voltage of the motor. It does not have the problem of instability of the field flux control nor the power loss of the resistance insertion technique. In the present invention, armature current feedback is used to implement the variation of the armature voltage via the buffer/sensor 22, the PGA 32, and the external amplifier 16 of FIG. 1.

To implement the motor speed control, the basic idea is that when $V_{out}$ is constant, the back emf of the motor, $V_e$ should remain constant for all motor currents $I_m$:

$$\frac{dV_e}{dI_m} = 0 \quad (2)$$

Using a simple motor model and applying Kirchoff's voltage law on the circuit of FIG. 1 results in the following equations:

$$V_{out} = I_m R_m + V_e + I_m R_s \quad (3)$$

$$\frac{V_{out} - G_2 I_m R_s}{R_2} + \frac{V_{control} - G_2 I_m R_s}{R_1} = 0 \quad (4)$$

where $R_m$ and $I_m$ are motor resistance and current respectively. The resistor values $R_1$ and $R_2$ are determined from the desired power amplifier gain, which depends on the range of $V_{control}$ and the rated motor voltage. The value of the sense resistor, $R_s$, should be selected as a compromise between minimizing the voltage drop and producing a signal with a good signal-to-noise ratio (about 10% of $R_m$ should be appropriate). The off-chip constant gain amplifier (buffer) 22 is used to buffer $V_s$ providing an option to make $R_s$ smaller.

Equations 3 and 4 are differentiated with respect to $I_m$, and combining the results gives:

$$\frac{dV_e}{dI_m} = G_2 R_s + \frac{R_2 G_2 R_S}{R_1} - R_m - R_s = 0 \quad (5)$$

Solving for $G_2$ yields the following equation:

$$G_2 = \frac{R_m/R_s + 1}{R_2/R_1 + 1} \quad (6)$$

This equation must be satisfied by the gain control loop. A similar derivation can be done for other amplifier designs; for example, a bridge amplifier (using two power amplifiers) produces the following equation instead of (6):

$$G_2 = \frac{R_m/R_s + 1}{R_2/R_1}$$

In order to maintain a constant speed for the motor, an update rule on the voltage applied to the DC motor 18 is necessary. This update rule must track the changes in motor current as torque on the motor 18 varies due to the robot's interaction with tissue. Changes in current are sensed by the sense resistor, $R_s$ as $V_s$. This voltage is passed through $G_2$, the programmable gain amplifier (PGA) 32, to the non inverting input of the external power op amp with gain $G_1$ (16).

This is the feedback voltage that ensures that $V_{out}$ is maintained at a level for constant speed of the motor 18. The design of the PGA 32 is made up of a network of resistors that would be tapped to set $G_2$. These resistors are selected based on the required gain using the microprocessor 14. This gain is the nominal gain which could change when the system 10 becomes operational, due to system non-linearities. To compensate for these changes, the speed of the motor 18 is measured using the DPS block 40. With the aid of the supervisory microprocessor 14, appropriate control signals are executed. If the motor 18 slows down as the motor interacts with the environment, it means that the system is undercompensated; hence, the gain is insufficient and the value of the $G_2$ should be increased to increase the $V_{out}$. On the other hand, during overcompensation, where too much gain causes the motor speed to increase under load, the value of $G_2$ should be decreased to reduce the value of $V_{out}$.

The control algorithm implemented in the microprocessor 14 ensures that the desired motor speed is maintained irrespective of the load by updating $V_{out}$ based on changes in $V_s$ and motor speed. The algorithm utilizes the idea that the induced emf in the motor due to $V_{out}$ is directly proportional to the motor speed. If equation 2 is rewritten in terms of $V_s$ (which is directly proportional to load torque), we obtain the following equation:

Error! Objects cannot be created from editing field codes. (7)

where k and ω are the back emf constant and velocity of the motor 18, respectively. Differentiating $V_{out}$ with respect to $V_s$ gives $dV_{out}/dV_s = R_m/R_s + k(d\omega/dV_s) + 1$. Requiring that the speed of the motor 18 remains constant with load, (i.e. $d\omega/dV_s = 0$), $dV_{out}/dV_s = R_m/R_s + 1 = k$ is obtained where, according to (6), k is also given by $G_2(R_2/R_1 + 1)$. This provides us an update rule for $V_{out}$ as a function of changes in $V_s$, provided that the gain k is set a priori. The update equation is given by (8):

Error! Objects cannot be created from editing field codes. (8)

where n is an index of time.

To set k on the fly during operation, the speed of the motor, ω, needs to be measured, and the change in ω used in a new update rule for k. The update rule (maintained in the supervisory microprocessor 14) on k can easily be derived as given in (9):

$$k(m+1) = k(m) - \mu[\omega(n+1) - \omega(m)] \quad (9)$$

where m is the time index for the update rule and µ is the user specified update rate. µ is also related to motor characteristics, and can be optimally chosen for fastest convergence. K is updated with $V_{out}$ constant and with a much shorter time constant than the update on $V_{out}$. In this way, i.e. if the change in motor speed is stabilized to zero as a function of applied torque, it is possible to instantaneously determine the armature impedance of the motor.

Figure 3:
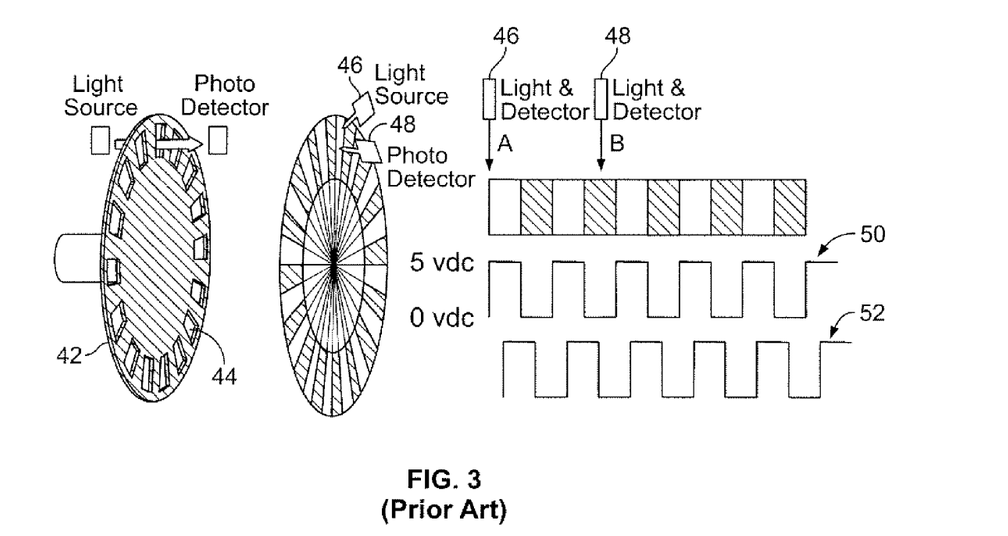
FIG. 3 is the design structure with the timing diagram of the incremental encoder used in conjunction with the motor control circuit of FIG. 1.

The incremental encoder 24 operates in conjunction with the DPS 40 to monitor the motor 18 for several parameters including motor speed, position, and rotation direction. Referring now to FIG. 3, incremental encoders are usually made of a circular glass disc 42 imprinted with m slots 44, which are equally distributed. Light shining through the slots 44 activates two sensors 46, 48, which produce two pulse trains 50, 52, that are 90 degrees out of phase (quadrature) with each other as shown. Depending on the direction of rotation, one of these pulses will lead or lag the other. The number of cycles and frequency of the pulses are respectively proportional to the angle of rotation (position of the motor) and the rate of change of the angle (speed of the motor).

Referring again to FIG. 1, the design of the DPS 40 is based on two techniques for obtaining velocity from an incremental encoder: (a) period counting and (b) frequency counting. Period counting involves counting pulses from a clock between successive pulses of the incremental encoder 24. If the encoder pulses per revolution, clock frequency and counter final values are respectively m, $f_p$ and $N_p$, then the velocity is given by equation 10 as follows $$\omega_p = \frac{2\pi}{m} \frac{f_p}{N_p} [\text{rad/sec}] = \frac{60}{m} \frac{f_p}{N_p} [\text{rpm}] \quad (10)$$

The relative error δx is equal to the absolute error divided by the true value:

$$\delta x = \Delta x/x = (xo - x)/x = xo/x - 1 \quad (11)$$

where x is the true value and $x_o$ is the measured or inferred value. The relative error for period counting, using (10), is:

$$\left|\frac{\Delta \omega p}{\omega}\right| = \frac{\omega o}{\omega} - 1 = \frac{\frac{2\pi}{m} \frac{fp}{Np + \Delta Np}}{\frac{2\pi}{m} \frac{fp}{Np}} - 1 = \frac{Np}{Np + \Delta Np} - 1 \quad (12)$$

-continued $$\left|\frac{\Delta \omega p}{\omega}\right| = \frac{-\Delta Np}{Np + \Delta Np} \approx \frac{\Delta Np}{Np} = \frac{\Delta Np}{2\pi f_p/m\omega} \quad (13)$$

Therefore the relative error due to counter errors ($\Delta N_p$) is given by:

$$\left|\frac{\Delta \omega_p}{\omega}\right| = \frac{m\omega}{2\pi f_p} \Delta N_p \quad (14)$$

The relative error is proportional to the velocity, which indicates that the period counting technique is more accurate at low speeds. Note that the quantization error is obtained by setting $\Delta N_p$ to 1 in eq. (14).

Frequency counting involves counting the number of pulses from the incremental encoder 24 in a known time, $T_f$. High count value means high speed while small count number indicates low speed. If $N_f$ is the final counter value, then the speed of the incremental encoder 24 is given by (15):

$$\omega_f = \frac{2\pi}{m} \frac{N_f}{T_f} [\text{rad/sec}] = \frac{60}{m} \frac{N_f}{T_f} [\text{rpm}] \quad (15)$$

Note that (15) assumes that $N_f$ is obtained without quadrature decoding of the encoder pulses. If quadrature decoding is used, then $N_f$ should be replaced by $N_f/4$.

The relative error of the system is given in (16) using (11).

$$\left|\frac{\Delta \omega_f}{\omega}\right| = \frac{60}{m} \frac{\Delta N_f}{\omega T_f} [\text{rpm}] \quad (16)$$

Here, the relative error is inversely proportional to the velocity, which indicates that the frequency counting technique is more accurate at high speeds. In this case, quantization error results from the lack of synchronization between the encoder pulses and the time observation window. This quantization error creates a 1-bit uncertainty in the measured counter value, $N_f$, which causes a measured speed error given by:

$$\Delta \omega_f = \frac{60}{mT_f} [\text{rpm}] \quad (17)$$

Figure 4:
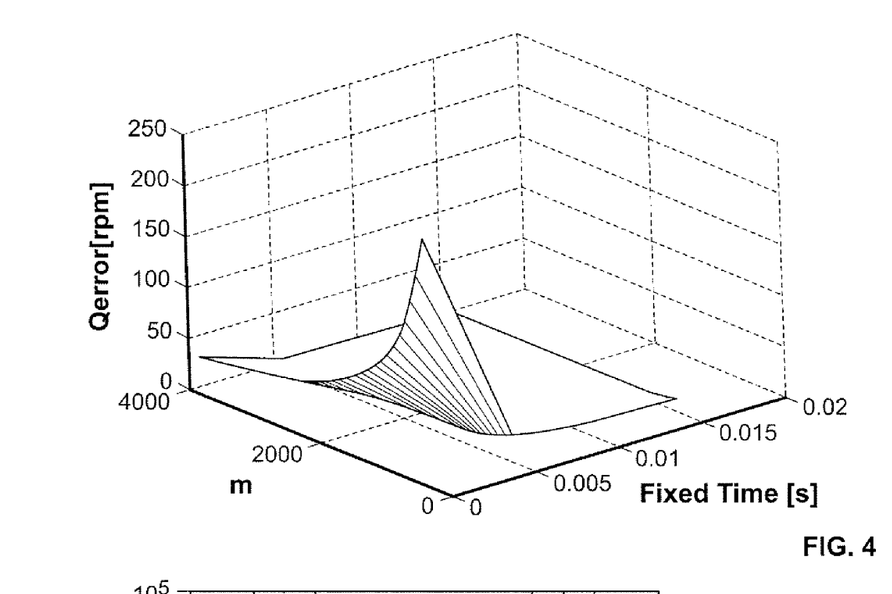
FIG. 4 is a three-dimensional plot of simulated frequency counting quantization error versus fixed time and number of pulses/revolution when used in conjunction with an incremental encoder.

Frequency counting is useful for medium and high speeds but degrades in performance at low speed because the relative error increases at low speed. FIG. 4 depicts a three-dimensional plot of simulated frequency counting quantization error versus fixed time and number of pulses/revolution. FIG. 4 shows that at high pulses per revolution (m), the error is significantly lower. Moreover, increasing the fixed time window reduces the relative error. In the present invention, the period counting and frequency counting techniques are combined for accurate measurement of both the high and low speed motor movements and the best technique is selected off-chip. An on-chip selector would require a 16 bit digital comparator, which would require significant silicon space. For adaptation to different applications, changing the values of $f_p$ and $T_f$ reconfigures the system as both are important parameters that determine the counter outputs for period and frequency counting, respectively.

Figure 6:
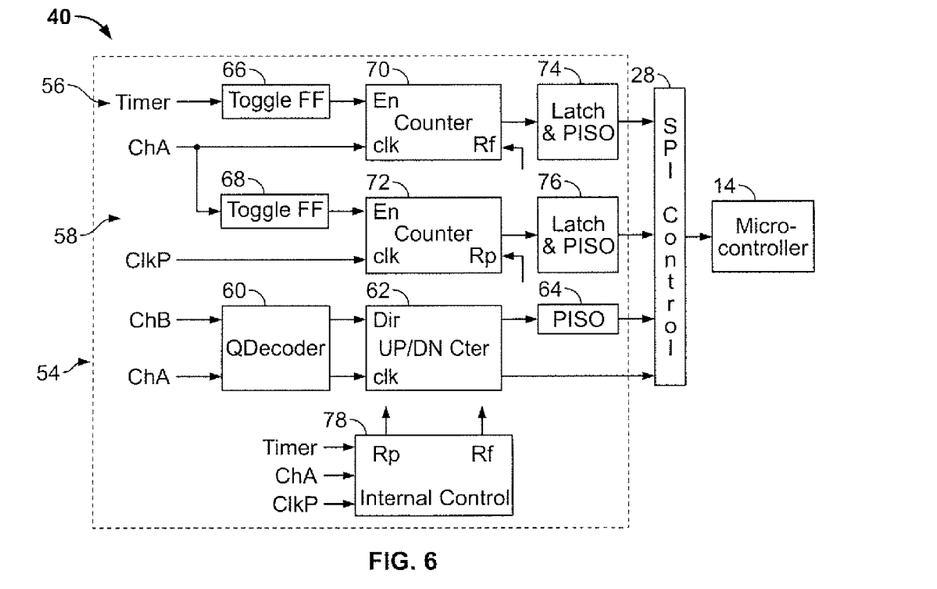
FIG. 6 is a detailed electrical block diagram of a digital position and speed (DPS) module associated with the motor control circuit of FIG. 1.

Three major constraints needed to be taken into consideration when designing the DPS 40 of the present invention: maximum possible count, encoder maximum frequency, and the least measurable velocity. The number of counts, which translates to the number of bits in a counter, are affected by m, $\omega$, $f_p$ and $T_f$ as shown in (10) and (12). The encoder maximum frequency depends on the encoder type; this influences the value of m (the number of slots in the encoder). The least measurable velocity takes into consideration that in frequency counting, at least a complete encoder pulse is required. This is important because the encoder pulse and sampling period, $T_f$, are not synchronized creating an uncertainty modeled in (17). To minimize this uncertainty, the period of the latter must be at least double the former to maintain Nyquist criterion and consequently reduce the relative error. This implies that the minimum measurable speed for frequency counting is given by:

$$\omega_{min} = \frac{60}{m} \frac{2}{T_f} [\text{rpm}] \quad (18)$$

For period counting, the least measurable velocity is limited by the maximum possible count, and is typically lower than the velocity given by (11).

If (10) and (15) are combined and equated, we obtain the speed where the period counts and frequency counts are the same. This is the system threshold speed, $\omega_{thr}$, given by (19):

$$\omega_{thr} = \frac{60}{m} \sqrt{\frac{f_p}{T_f}} \quad (19)$$

The percentage errors for period ($\text{Error}_p$) and frequency ($\text{Error}_f$) techniques are given in (20) and (21), respectively, where $f_{enc}$ is the encoder frequency:

$$\% \text{ Error}_p = \frac{f_{enc}}{f_p - f_{enc}} \quad (20)$$

$$\% \text{ Error}_f = \frac{1}{f_{enc} \cdot T_f} \quad (21)$$

To ensure that the quantization error stays less than 1% and an n-bit counter does not overflow, the range of encoder frequency ($f_{enc}$) is given by (22) and (23) for period and frequency counting, respectively. For (22), the upper bound is computed from (20). Similarly, for (23), the lower bound is computed from (21).

$$\frac{f_p}{2^n - 1} \leq f_{enc} \leq \frac{f_p}{101} \quad (22)$$

$$\frac{100}{T_f} \leq f_{enc} \leq \frac{2^n - 1}{T_f} \quad (23)$$

From both (22) and (23), increasing n will increase the range of the encoder frequency before saturation of the counters.

Figure 5:
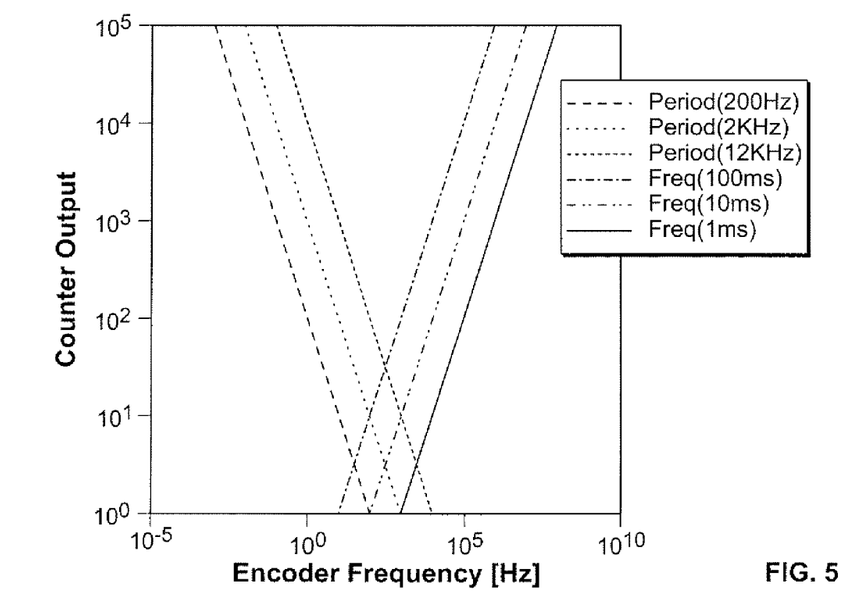
FIG. 5 is a plot of predicted counter values for different encoder frequencies when using the techniques of period counting or frequency counting of pulses received from an incremental encoder.

Predicted counter values for different encoder frequencies are shown in FIG. 5. For a 16-bit counter, the maximum possible counter value is 65535 and accordingly the values are restricted by this upper limit to avoid overflow.

Position measurement involves counting the encoder pulses to estimate the position of the encoder. Here, a standard quadrature technique is used to obtain 4 counts for each encoder period. To determine the direction of encoder rotation, the channels are first decoded into UP or DOWN signals to ascertain which channel (A or B) leads the other. Acceleration, rate of change of velocity, can be computed using the velocity values and time stamps in the microcontroller (i.e., discrete differentiation).

Referring now to FIG. 6, a schematic block diagram of the architecture of the DPS 40 is depicted, constructed in accordance with an embodiment of the present invention. The DPS 40 comprises digital circuits that are used to realize the position and velocity measurements of the DC motor 18 via the two quadrature signals, ChA and ChB received from the incremental encoder 24 of FIG. 1. The quadrature signals, ChA and ChB, are fed to three paths: a path 54 for position measurement; a path 56 for speed measurement based on frequency counting; and a path 58 for speed measurement based on period counting. The position measurement path 54 includes a QDECODER block 60, a 16-bit UP/DOWN counter 62, and a parallel in-serial out register (PISO) 64. Both the frequency counting path 56 and the period counting path 58 include toggle flip flops 66, 68, counters 70, 72, and Latch and PISO registers 74, 76, respectively. A combinational/synchronous control block 78 takes the timing signal from the supervisory microcontroller 14 (timer) and the quadrature inputs from the incremental encoder 24 (ChA, ChB) and produces reset signals $R_f$ and $R_p$ for resetting the counters 70, 72, to be described herein below.

Figure 7:
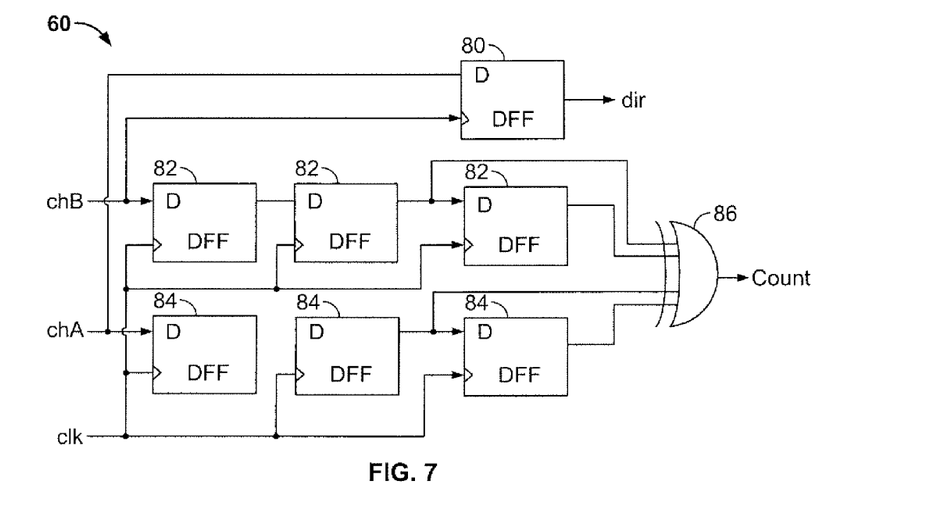
FIG. 7 is a detailed electrical schematic diagram of the QDECODER block associated with the DPS module of FIG. 6.

Referring now to FIGS. 1, 6 and 7, for position measurement, the quadrature outputs of the incremental encoder 24 (ChA, ChB) are decoded to an UP or DOWN signal (the encoder direction signal) by the QDECODER block 60, which is shown in FIG. 7. The QDECODER block 60 includes sets of D flip flops (DFFs) 80, 82, 84 and an exclusive-or gate (XOR) 86, connected as shown. The 16-bit UP/DOWN synchronous counter 62 is used to count the quadrature pulse, count, produced as the output of the QDECODER block 60 of FIG. 7. The supervisory microcontroller 14 uses the direction signal (dir of FIG. 7) to determine the direction of rotation of the motor 18. The PISO register 64 is used to transfer the parallel outputs of the 16-bit UP/DOWN counter 62 into serial format. Transfer is completed within 16 clock cycles supplied by the SPI clock (not shown). The SPI 28 of FIG. 1 ensures that results of each of the measurements (position, velocity-period, and frequency counting) are synchronized for the supervisory microcontroller 14.

Figure 8:
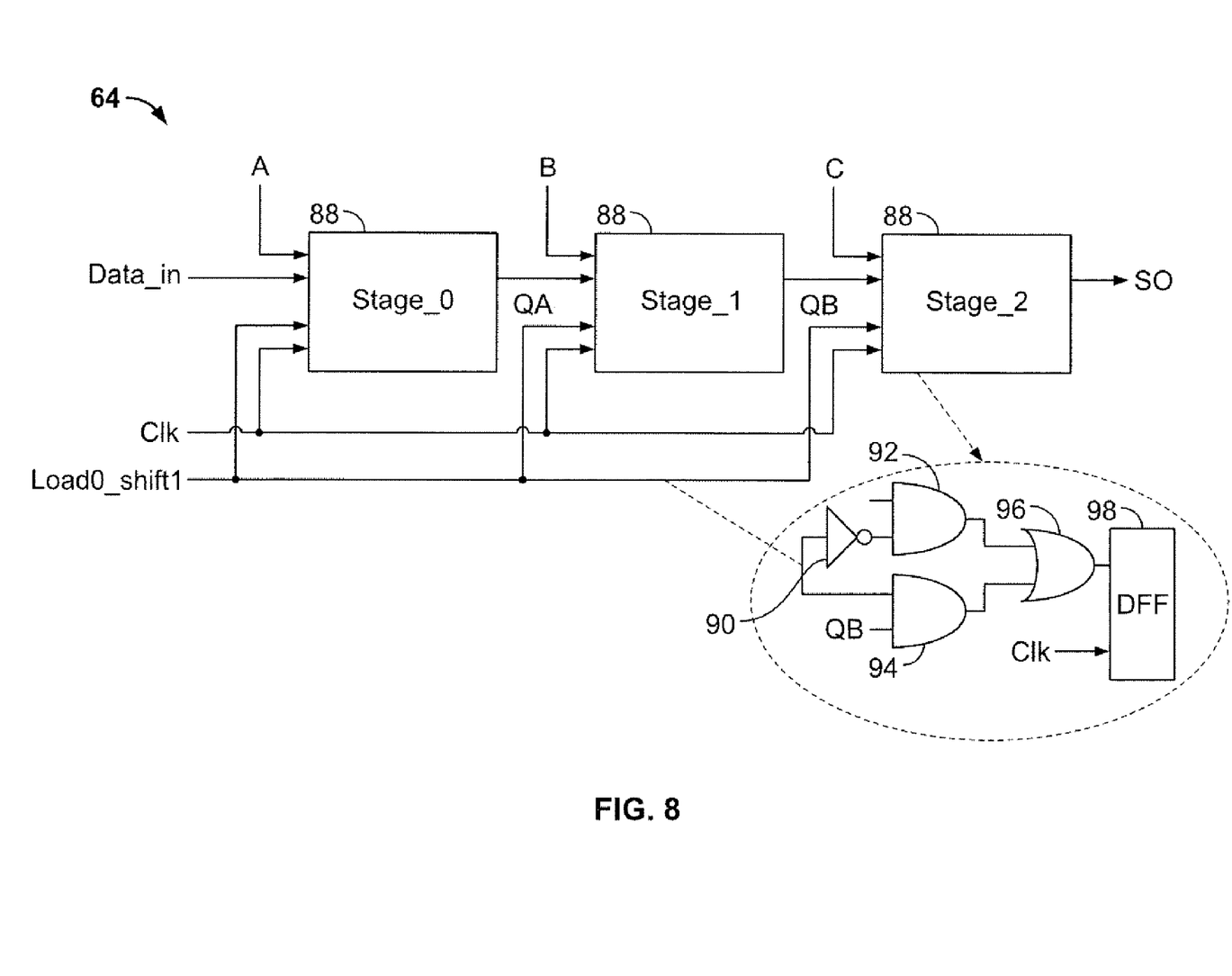
FIG. 8 is a detailed electrical schematic diagram of a parallel-in-serial out register (PISO) associated with the motor control circuit of FIG. 1.

FIG. 8 shows the design of the PISO register 64. A 3-bit design is presented for simplicity; the implemented design contains 16-bits. Each of the one-bit stages 88 includes combinational logic comprising an inverter 90, two AND gates 92, 94, an OR gate 96, and a D-flip flop 98, connected as shown in the inset of FIG. 8. The supervisory microprocessor 14 via the SPI 28 provides input signal load0_shift1 and clk signals. When the load0_shift1 signal goes low, bits A, B and C are loaded in parallel at the falling edge of clk to the outputs of the D-flip flops 98. When load0_shift1 goes high, the bits are right shifted at each falling edge of clk. The load0_shift1 signal is pulled low immediately after the internally generated latch signal has completed data transfer from the counter to a LATCH (not shown). The integrity of the system is preserved by keeping load0_shift1 high throughout the right shift operation.

Referring again to FIGS. 1 and 6, the path 56 for speed measurement based on frequency counting shows the frequency counting velocity measurement. Here, a fixed time pulse (timer) is applied to the toggle flip flop 66 which is connected to an enable input (En) of a counter 70. This ensures that counting is only possible when the En is active. Channel A, ChA, of the incremental encoder 24 is applied to the clock (clk) input. The counter 70 counts the number of pulses of the ChA within the window when En is active. The final value of the counter is latched and through the PISO 74 is transferred to the supervisory microcontroller 14. The implementation for the period counting velocity measurement technique shown along path 58 is similar to the frequency method except that the input to the flip flop 68 is channel A (ChA) and a pulse (ClkP) is applied to the clock input of the counter 72. The counter 72 counts the number of pulses from ClkP that occur between successive pulses of the incremental encoder 24. At the end of every counting cycle, internally generated signals latch the counter values to the LATCH & PISO 76. This is followed by an internally generated reset signal (Rf or Rp) that resets the counter 72, thereby preparing it for the next counting sequence. Data latching and counter reset are completed before the En signal is pulled high for the next sequence. Note that for the period counting, it is important to use just one encoder channel (in our case ChA); if both channels are used, the measured velocity loses accuracy if the phase difference is not exactly 90 degrees, which is rarely the case in practice.

In addition to velocity and position measurements, acceleration, rate of change of velocity, can be computed in the microcontroller using (26). Using the velocity measured by frequency counting gives the acceleration as:

$$a = \frac{3600}{m} \frac{N_{f_k} - N_{f_{k-1}}}{T_f^2} [\text{rpm}^2] \qquad (26)$$

where $N_{f_k}$ and $N_{f_{k-1}}$ are two successive counter results in time stamps k and k-1, respectively.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed:

1. An integrated circuit for controlling at least one motor comprising:
    at least one digital position and speed circuit (DPS) for providing measurements of speed, position, and direction of the at least one motor, the at least one DPS being in signal communication with the at least one motor for receiving a pair of signals having a quadrature relationship;
    at least one programmable gain amplifier (PGA) electrically coupled to the at least one motor, the PGA being configured to receive a feedback signal indicative of current flowing through the at least one motor and to apply a second signal to the at least one motor for adjusting the speed of the at least one motor;

wherein the at least one DPS is configured to measure the speed of the at least one motor based on one of frequency counting and period counting;
wherein frequency counting is implemented by counting a number of pulses from the pair of signals having a quadrature relationship that occur within a fixed time window;
wherein the circuitry for measuring the speed of the at least one motor based on frequency counting comprises:
a toggle flip flop for receiving a fixed time pulse;
a counter electrically coupled to the toggle flip flop, the toggle flip flop enabling the counter for a fixed period of time, the counter receiving the one of the pair of signals, the counter being configured to count a number of pulses from the one of the pair of signals for the time the counter is enabled so as to provide an indication of the frequency of the at least one motor; and
a latch and PISO electrically coupled to the counter for storing and parallel in-serial out register serializing the indication of the frequency of the at least one motor.

2. The integrated circuit of claim 1, wherein the at least one DPS further comprises:
a QDECODER circuit block for decoding the pair of signals having a quadrature relationship to an UP or DOWN signal for providing an indication of the direction of rotation of the at least one motor and for providing a count signal indicative of a quadrature pulse count;
an UP/DOWN synchronous counter electrically coupled to the QDECODER circuit block for counting the quadrature pulse count; and
a parallel in-serial out register (PISO) electrically coupled to the UP/DOWN synchronous counter for serializing the quadrature pulse count so as to provide an indication of motor position.

3. An integrated circuit for controlling at least one motor, comprising:
at least one digital position and speed circuit (DPS) for providing measurements of speed, position, and direction of the at least one motor, the at least one DPS being in signal communication with the at least one motor for receiving a pair of signals having a quadrature relationship;
at least one programmable gain amplifier (PGA) electrically coupled to the at least one motor, the PGA being configured to receive a feedback signal indicative of current flowing through the at least one motor and to apply a second signal to the at least one motor for adjusting the speed of the at least one motor;
wherein the at least one DPS is configured to measure the speed of the at least one motor based on one of frequency counting and period counting;
wherein period counting is implemented by counting a number of pulses from a timer that occur between consecutive pulses from the pair of signals having a quadrature relationship;
wherein the circuitry for measuring the speed of the at least one motor based on period counting comprises:
a toggle flip flop for receiving one of the pair of signals;
a counter electrically coupled to the toggle flip flop, the counter receiving an external clock, the counter being configured to count the number of pulses from the external clock that occur between successive pulses of the one of the pair of signals so as to provide an indication of the time period of the at least one motor; and
a latch and PISO electrically coupled to the counter for storing and serializing the indication of the time period of the at least one motor.

4. The integrated circuit of claim 3 wherein the at least one DPS further comprises:
a QDECODER circuit block for decoding the pair of signals having a quadrature relationship to an UP or DOWN signal for providing an indication of the direction of rotation of the at least one motor and for providing a count signal indicative of a quadrature pulse count;
an UP/DOWN synchronous counter electrically coupled to the QDECODER circuit block for counting the quadrature pulse count; and
a parallel in-serial out register (PISO) electrically coupled to the UP/DOWN synchronous counter for serializing the quadrature pulse count so as to provide an indication of motor position.

5. An integrated circuit for controlling at least one motor comprising:
at least one digital position and speed circuit (DPS) for providing measurements of speed, position, and direction of the at least one motor, the at least one DPS being in signal communication with the at least one motor for receiving a pair of signals having a quadrature relationship;
at least one programmable gain amplifier (PGA) electrically coupled to the at least one motor the PGA being configured to receive a feedback signal indicative of current flowing through the at least one motor and to apply a second signal to the at least one motor for adjusting the speed of the at least one motor;
at least one digital-to-analog converter (D/A) configured to set the motor voltage;
at least one second digital-to-analog converter (D/A) configured to set a maximum limit on motor current;
at least one analog-to-digital converter (A/D) electrically coupled to the at least one PGA for receiving a measurement of the feedback signal of the at least one PGA as an indication of motor current; and
at least one second A/D for measuring the initial position of the at least one motor.

6. The integrated circuit of claim 5, further comprising at least one serial-to-parallel interface (SPI) circuit for providing clock and control signals to the at least one DPS and for synchronizing the signals for indicating the speed, position, and direction of the at least one motor.

7. The integrated circuit of claim 5, wherein the at least one DPS further comprises:
a QDECODER circuit block for decoding the pair of signals having a quadrature relationship to an UP or DOWN signal for providing an indication of the direction of rotation of the at least one motor and for providing a count signal indicative of a quadrature pulse count;
an UP/DOWN synchronous counter electrically coupled to the QDECODER circuit block for counting the quadrature pulse count; and
a parallel in-serial out register (PISO) electrically coupled to the UP/DOWN synchronous counter for serializing the quadrature pulse count so as to provide an indication of motor position.

8. A motor control circuit for controlling at least one motor, comprising:
an integrated circuit, comprising:
at least one digital position and speed circuit (DPS) for providing measurements of speed, position, and direction of the at least one motor, the DPS being in signal communication with the at least one motor for receiving a pair of signals having a quadrature relationship;
at least one programmable gain amplifier (PGA) electrically coupled to the at least one motor, the PGA being configured to receive a feedback signal indicative of current flowing through the at least one motor and to apply a second signal to the at least one motor for adjusting the speed of the at least one motor;

at least one summing amplifier electrically coupled to the at least one PGA for providing the feedback signal to the at least one motor that is indicative of current flowing through the at least one motor;

at least one buffer amplifier electrically coupled to the at least one motor and to the at least one PGA for sensing the output current of the at least one motor;

a processor for providing control signals to the at least one DPS, for providing a control voltage to the at least one summin amplifier and for receiving the measurements of speed position, and location of the at least one motor;

wherein the at least one DPS is configured to measure the speed of the at least one motor based on one of frequency counting and period counting;

wherein frequency counting is implemented by counting a number of pulses from the pair of signals having a quadrature relationships that occur within a fixed time window;

wherein the at least one DPS further comprises circuitry for measuring the speed of the at least one motor based on frequency counting, comprising:

a toggle flip flop for receiving a fixed time pulse from the processor;

a counter electrically coupled to the toggle flip flop, the toggle flip flop enabling the counter for a fixed period of time, the counter receiving the one of the pair of signals, the counter being configured to count a number of pulses from the one of the pair of signals for the time the counter is enabled so as to provide an indication of the frequency of the at least one motor; and a latch and PISO electrically coupled to the counter for storing and serializing the indication of the frequency of the at least one motor.

9. The motor control circuit of claim 8, further comprising at least one incremental encoder optically coupled to the at least one motor for providing the pair of signals having a quadrature relationship.

10. The motor control circuit of claim 8, further comprising at least one potentiometer for setting the initial position of the at least one motor, the potentiometer being coupled to at least one A/D.

11. The motor control circuit of claim 8, wherein the at least one DPS further comprises:

a QDECODER circuit block for decoding the pair of signals having a quadrature relationship to an UP or DOWN signal for providing an indication of the direction of rotation of the at least one motor and for providing a count signal indicative of a quadrature pulse count;

an UP/DOWN synchronous counter electrically coupled to the QDECODER circuit block for counting the quadrature pulse count; and a parallel in-serial out register (PISO) electrically coupled to the UP/DOWN synchronous counter and the processor for serializing the quadrature pulse count so as to provide an indication of motor position.

12. The motor control circuit of claim 8, wherein an integrated circuit for controlling at least one motor, comprising:

at least one digital position and speed circuit (DPS) for providing measurements of speed, position, and direction of the at least one motor, the at least one DPS being in signal communication with the at least one motor for receiving a pair of signals having a quadrature relationship.

13. A motor control circuit for controlling at least one motor, comprising:

an integrated circuit, comprising:

at least one digital position and speed circuit (DPS) for providing measurements of speed, position, and direction of the at least one motor, the DPS being in signal communication with the at least one motor for receiving a pair of signals having a quadrature relationship;

at least one programmable gain amplifier (PGA) electrically coupled to the at least one motor, the PGA being configured to receive a feedback signal indicative of current flowing through the at least one motor and to apply a second signal to the at least one motor for adjusting the speed of the at least one motor;

at least one summing amplifier electrically coupled to the at least one PGA for providing the feedback signal to the at least one motor that is indicative of current flowing through the at least one motor;

at least one buffer amplifier electrically coupled to the at least one motor and to the at least one PGA for sensing the output current of the at least one motor;

a processor for providing control signals to the at least one DPS, for providing a control voltage to the at least one summin amplifier and for receiving the measurements of speed position, and location of the at least one motor; and wherein period counting is implemented by counting a number of pulses from a timer that occur between consecutive pulses from the pair of signals having a quadrature relationship.

14. The motor control circuit of claim 13, wherein the at least one DPS further comprises circuitry for measuring the speed of the at least one motor based on period counting, comprising:

a toggle flip flop for receiving one of the pair of signals;

a counter electrically coupled to the toggle flip flop, the counter receiving an external clock, the counter being configured to count the number of pulses from the external clock that occur between successive pulses of the one of the pair of signals so as to provide an indication of the time period of the at least one motor; and a latch and PISO electrically coupled to the counter and the processor for storing and serializing the indication of the time period of the at least one motor.

15. The motor control circuit of claim 13, further comprising at least one digital-to-analog (D/A) converter electrically coupled to the processor for providing the control voltage to the at least one summing amplifier.

16. The motor control circuit of claim 15, wherein the at least one summing amplifier further comprises a feedback resistor $R_2$ electrically connected between an output and an inverting input of the at least one summing amplifier and a second resistor $R_1$ electrically connected to the inverting input and electrically connected to an output of the at least one D/A, wherein the at least one buffer amplifier further comprises a resistor $R_s$ that senses motor current and is electrically connected between an input to the at least one buffer amplifier and a ground node, and where the gain $G_2$ of the PGA is adjusted to maintain motor speed in response to changes in motor resistance $R_m$ based on $$G_2 = \frac{R_m/R_s + 1}{R_2/R_1 + 1}.$$

17. The motor control circuit of claim 16, wherein the at least one summing amplifier further comprises an input for limiting the current to the at least one motor, and wherein the signal on the input for limiting current is varied while the control voltage to the at least one summing amplifier is held constant so as to control the torque of the at least one motor.

18. The motor control circuit of claim 17, wherein the signal on the input for limiting current is held constant while the control voltage to the at least one summing amplifier is varied based on an initial position measurement of the at least one motor and a current position measurement from the integrated circuit so as to control the position of the at least one motor.

19. The motor control circuit of claim 17, wherein the signal on the input for limiting current is held constant while the control voltage to the at least one summing amplifier is varied based on a current speed measurement from the integrated circuit so as to control the speed of the at least one motor.

20. The motor control circuit of claim 13, further comprising at least one incremental encoder optically coupled to the at least one motor for providing the pair of signals having a quadrature relationship.

21. The motor control circuit of claim 13, further comprising at least one potentiometer for setting the initial position of the at least one motor, the potentiometer being coupled to at least one A/D.

22. The motor control circuit of claim 13, wherein the at least one DPS further comprises:
- a QDECODER circuit block for decoding the pair of signals having a quadrature relationship to an UP or DOWN signal for providing an indication of the direction of rotation of the at least one motor and for providing a count signal indicative of a quadrature pulse count;
- an UP/DOWN synchronous counter electrically coupled to the QDECODER circuit block for counting the quadrature pulse count; and
- a parallel in-serial out register (PISO) electrically coupled to the UP/DOWN synchronous counter and the processor for serializing the quadrature pulse count so as to provide an indication of motor position.

23. A motor control circuit for controlling at least one motor, comprising:
an integrated circuit, comprising:
- at least one digital position and speed circuit (DPS) for providing measurements of speed, position, and direction of the at least one motor, the DPS being in signal communication with the at least one motor for receiving a pair of signals having a quadrature relationship;
- at least one programmable gain amplifier (PGA) electrically coupled to the at least one motor, the PGA being configured to receive a feedback signal indicative of current flowing through the at least one motor and to apply a second signal to the at least one motor for adjusting the speed of the at least one motor;
- at least one summing amplifier electrically coupled to the at least one PGA for providing the feedback signal to the at least one motor that is indicative of current flowing through the at least one motor;
- at least one buffer amplifier electrically coupled to the at least one motor and to the at least one PGA for sensing the output current of the at least one motor;
- a processor for providing control signals to the at least one DPS, for providing a control voltage to the at least one summin amplifier and for receiving the measurements of speed, position, and location of the at least one motor; and
- wherein the processor updates input voltage to the at least one motor based on the update rule $k(m+1)=k(m)-\mu[\omega(m+1)-\omega(m)]$ where k and $\omega$ are the back emf constant and velocity of the at least one motor, where m is the time index for the update rule, and $\mu$ is a user specified update rate.

24. The motor control circuit of claim 23, further comprising at least one incremental encoder optically coupled to the at least one motor for providing the pair of signals having a quadrature relationship.

25. The motor control circuit of claim 23, further comprising at least one potentiometer for setting the initial position of the at least one motor, the potentiometer being coupled to at least one A/D.

26. The motor control circuit of claim 23, wherein the at least one DPS further comprises:
- a QDECODER circuit block for decoding the pair of signals having a quadrature relationship to an UP or DOWN signal for providing an indication of the direction of rotation of the at least one motor and for providing a count signal indicative of a quadrature pulse count;
- an UP/DOWN synchronous counter electrically coupled to the QDECODER circuit block for counting the quadrature pulse count; and
- a parallel in-serial out register (PISO) electrically coupled to the UP/DOWN synchronous counter and the processor for serializing the quadrature pulse count so as to provide an indication of motor position.

27. The motor control circuit of claim 13, wherein an integrated circuit for controlling at least one motor, comprising:
- at least one digital position and speed circuit (DPS) for providing measurements of speed, position, and direction of the at least one motor, the at least one DPS being in signal communication with the at least one motor for receiving a pair of signals having a quadrature relationship.

28. The motor control circuit of claim 23, wherein an integrated circuit for controlling at least one motor, comprising:
- at least one digital position and speed circuit (DPS) for providing measurements of speed, position, and direction of the at least one motor, the at least one DPS being in signal communication with the at least one motor for receiving a pair of signals having a quadrature relationship.

* * * * *

UNITED STATES PATENT AND TRADEMARK OFFICE
CERTIFICATE OF CORRECTION

PATENT NO. : 7,835,630 B2  Page 1 of 1
APPLICATION NO. : 12/061896
DATED : November 16, 2010
INVENTOR(S) : Peter Kazanzide et al.

It is certified that error appears in the above-identified patent and that said Letters Patent is hereby corrected as shown below:

In the Specification

Column 1, at the first page of the patent after the title, please add the following paragraph:

STATEMENT OF GOVERNMENTAL INTEREST

This invention was made with government support under EEC9731478 awarded by the National Science Foundation. The government has certain rights in the invention.

Signed and Sealed this
Second Day of September, 2014

Michelle K. Lee
*Deputy Director of the United States Patent and Trademark Office*